US009343917B2

United States Patent
Yang (10) Patent No.: US 9,343,917 B2
(45) Date of Patent: May 17, 2016

(54) CONTROL CIRCUIT FOR CHARGING BATTERY THROUGH PROGRAMMABLE POWER SUPPLIER

(71) Applicant: SYSTEM GENERAL CORPORATION, New Taipei (TW)

(72) Inventor: Ta-Yung Yang, Milpitas, CA (US)

(73) Assignee: SYSTEM GENERAL CORPORATION, New Taipei (TW)

( * ) Notice: Subject to any disclaimer, the term of this patent is extended or adjusted under 35 U.S.C. 154(b) by 164 days.

(21) Appl. No.: 14/191,952

(22) Filed: Feb. 27, 2014

(65) Prior Publication Data

US 2014/0239885 A1  Aug. 28, 2014

Related U.S. Application Data

(60) Provisional application No. 61/769,831, filed on Feb. 27, 2013.

(51) Int. Cl.
*H02J 7/00* (2006.01)
(52) U.S. Cl.
CPC ............. *H02J 7/0052* (2013.01); *H02J 7/0036* (2013.01); *H02J 7/0077* (2013.01); *H02J 2007/0059* (2013.01); *Y02B 40/90* (2013.01)
(58) Field of Classification Search
CPC ...... Y02E 60/12; H02J 7/0042; H02J 7/0045; H02J 7/008; H02J 7/0072; H02J 7/0031; H02J 7/0068; H02J 7/022; H01M 10/46; H01M 10/44
USPC ........................................................ 320/107
See application file for complete search history.

(56) References Cited

U.S. PATENT DOCUMENTS

| | | | | |
|---|---|---|---|---|
| 5,060,131 A * | 10/1991 | Sikora | ............... | H02M 3/33507 363/21.09 |
| 8,030,884 B2 * | 10/2011 | King | ........................ | H02J 1/10 307/45 |
| 2004/0164707 A1 * | 8/2004 | Veselic | ................... | G06F 1/266 320/128 |
| 2008/0122399 A1 * | 5/2008 | Nishino | ................ | H02J 7/0075 320/103 |
| 2010/0072956 A1 * | 3/2010 | Fiebrich | .................... | G06F 1/26 320/162 |
| 2010/0301802 A1 * | 12/2010 | Iida | ...................... | B60L 11/1816 320/109 |
| 2011/0123041 A1 * | 5/2011 | Turnbull | ................. | H04R 3/00 381/86 |

* cited by examiner

*Primary Examiner* — Arun Williams
(74) *Attorney, Agent, or Firm* — McClure, Qualey & Rodack, LLP (57) ABSTRACT

A charging circuit for charging a battery is provided. A power supplier has a communication interface coupled to a cable for receiving command-data and generates a DC voltage and a DC current in accordance with the command-data. A controller is coupled to the battery for detecting a battery-voltage and generates the command-data in accordance with the battery-voltage. A switch is coupled to the cable for receiving the DC voltage and the DC current through a connector. The DC voltage and the DC current generated by the power supply are coupled to the cable, and the DC voltage and the DC current are programmable in accordance with the command-data. The command-data generated by the controller is coupled the cable through a communication circuit of the controller. The controller is coupled the connector for detecting a connector-voltage and control an on/off state of the switch in response to the connector-voltage.

14 Claims, 7 Drawing Sheets

CONTROL CIRCUIT FOR CHARGING BATTERY THROUGH PROGRAMMABLE POWER SUPPLIER

CROSS REFERENCE TO RELATED APPLICATIONS

This application claims the benefit of U.S. Provisional Application No. 61/769,831, filed on Feb. 27, 2013, the contents of which are incorporated herein by reference.

BACKGROUND OF THE INVENTION

1. Field of the Invention

The present invention relates to a charging circuit for charging a battery, and more particularly to a control circuit for charging by using a programmable power supplier.

2. Description of the Related Art

A traditional approach has a programmable DC/DC converter (such as a buck converter or a buck/boost converter) equipped in the battery-side (close to the battery) for charging the battery. The input of this programmable DC/DC converter is coupled to the output of a power supplier via its output cable. The power supplier also comprises a DC/DC converter with a constant voltage output. The drawback of the traditional approach is low efficiency caused by the power losses of the two DC/DC converters. A buck converter or a buck/boost converter in the battery-side cause further power loss.

BRIEF SUMMARY OF THE INVENTION

The object of the present invention is to eliminate the need of DC/DC converter in the battery-side and improve the efficiency for battery charge.

An exemplary embodiment of a charging circuit for charging a battery. The charging circuit comprises a power supplier, a controller, and a switch. The power supplier has a communication interface coupled to a cable of the power supplier for receiving command-data. The power supplier generates a DC voltage and a DC current in accordance with the command-data. The controller is coupled to the battery for detecting a battery-voltage and generates the command-data in accordance with the battery-voltage. The switch is coupled to the cable for receiving the DC voltage and the DC current through a connector. The DC voltage and the DC current generated by the power supply are coupled to the cable, and the DC voltage and the DC current are programmable in accordance with the command-data. The command-data generated by the controller is coupled the cable through a communication circuit of the controller. The controller is coupled the connector for detecting a connector-voltage and control an on/off state of the switch in response to the connector-voltage.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
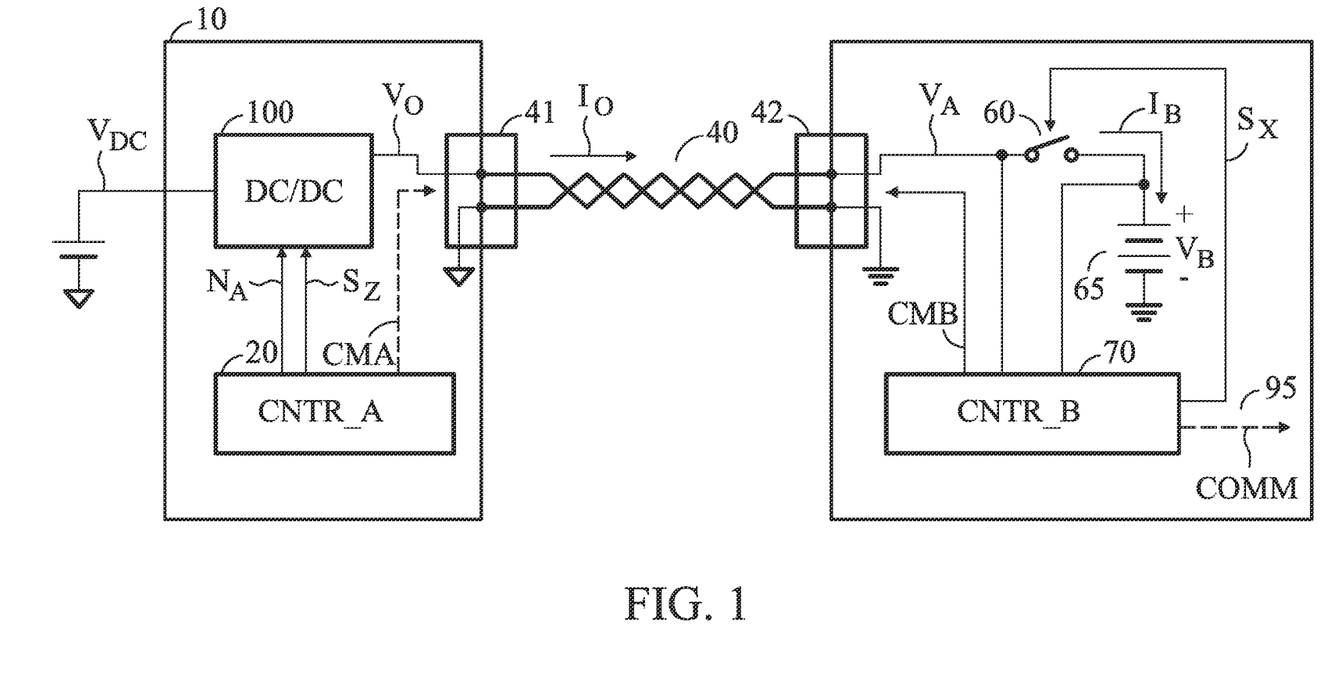
FIG. 1 shows an exemplary embodiment of a charging circuit in accordance with the present invention.

FIG. 1 shows an exemplary embodiment of the present invention. A power supplier 10 has a communication interface CMA coupled to a cable 40 through a connector 41 for receiving command-data and generating an output voltage $V_O$ and an output current $I_O$ in accordance with the command-data. The cable 40 is the output cable of the power supplier 10. The output voltage $V_O$ and the output current $I_O$ generated by the power supplier 10 are delivered to the cable 40. A controller (CNTR_B) 70 is coupled to a battery 65 to detect a battery-voltage $V_B$ of the battery 65. The controller 70 generates the command-data in accordance with the detected battery-voltage $V_B$. A terminal of the switch 60 is coupled to the cable 40 for receiving the output voltage $V_O$ and the output current $I_O$ through a connector 42. Another terminal of the switch 60 is coupled to the battery 65 for charging the battery 65. The output voltage $V_O$ and the output current $I_O$ are programmable in accordance with the command-data. The command-data generated by the controller 70 is coupled to the cable 40 through a communication interface CMB of the controller 70. The controller 70 is coupled the connector 42 to detect a connector-voltage $V_A$. The controller 70 generates a control signal $S_X$ in response to the connector-voltage $V_A$ to control the on/off state of the switch 60. The switch 60 will be turned off if the voltage drop of the cable 40 and the connector 42 is high. The controller 70 further has a communication port (COMM) 95 coupled to a host CPU, such as a CPU of a mobile-phone or a CPU of a notebook PC, etc.

The power supplier 10 comprises an input terminal coupled to a DC power source $V_{DC}$ for generating a DC voltage of the output voltage $V_O$ and a DC current of the output current $I_O$. The DC power source $V_{DC}$ could be a battery or the output of an offline AC/DC power supplier (or a power adapter). The power supplier 10 comprises a programmable power supply circuit (DC/DC) 100 for generating the output voltage $V_O$ and output current $I_O$ in accordance with the control of a control circuit (CNTR_A) 20. The control circuit 20 is coupled to the cable 40 via the communication interface CMA for receiving and sending the command-data. The control circuit 20 generates a control signal $S_Z$ and a data-bus signal $N_A$ coupled to control the programmable power supply circuit 100. One example for the approach of the communication interface CMA and CMB can be found in a prior art of U.S. Pat. No. 8,154,153 titled "Method and apparatus for providing a communication channel through an output cable of a power supply".

Figure 2:
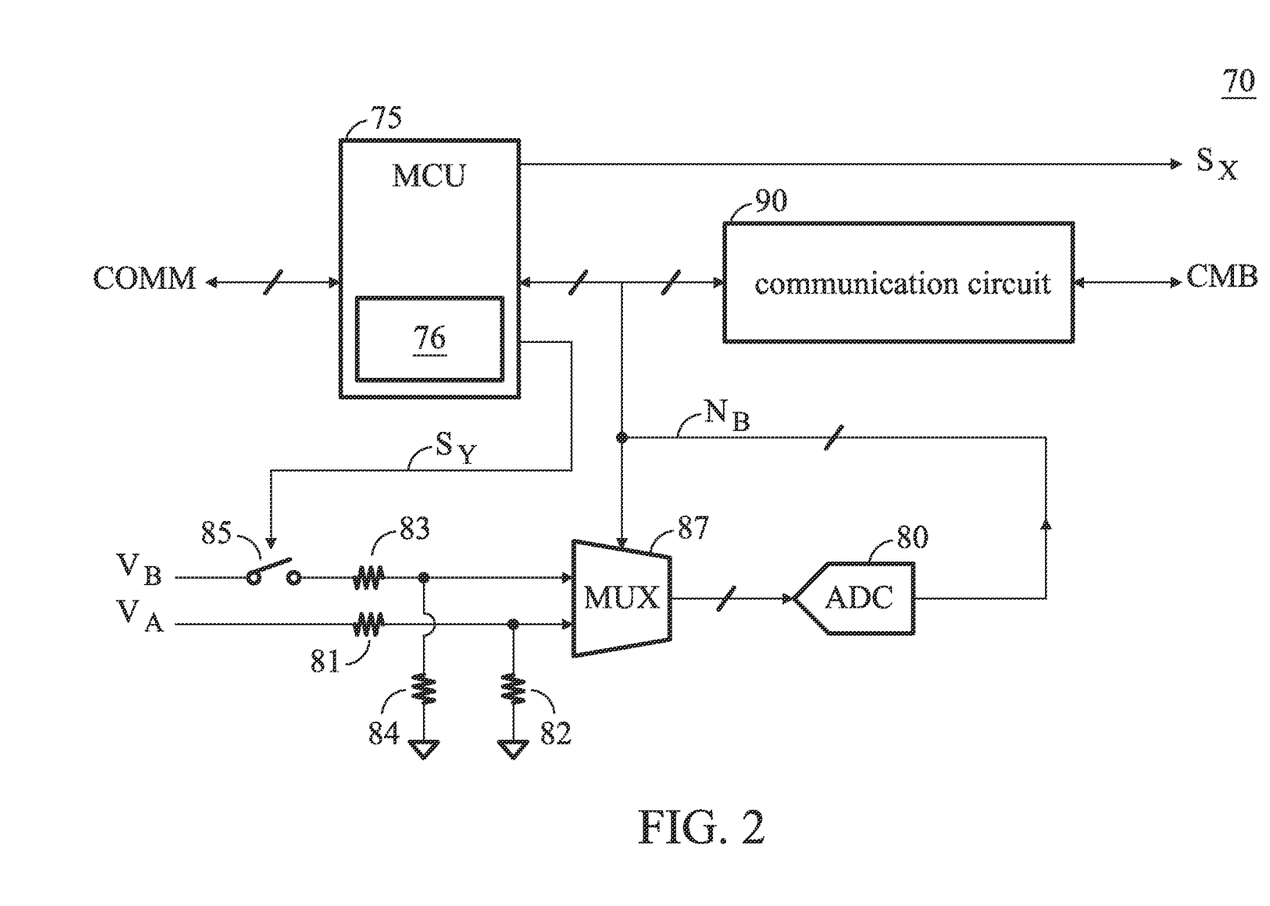
FIG. 2 shows an exemplary embodiment of a controller of the charging circuit in FIG. 1.

FIG. 2 shows an exemplary embodiment of the controller 70 in accordance with the present invention. The controller 70 comprises an analog-to-digital converter (ADC) 80 coupled to the battery 65 through a multiplexer (MUX) 87, resistors 83 and 84, and a switch 85 for detecting the battery-voltage $V_B$. The analog-to-digital converter 80 is further coupled to the connector 42 via the multiplexer 87 and resistors 81 and 82 for detecting the connector-voltage $V_A$. A microcontroller (MCU) 75 comprises a memory 76. The memory 76 comprises a program memory and a data memory (not shown). The microcontroller 75 generates a control signal $S_Y$ coupled to control the on/off state of the switch 85. The microcontroller 75 generates the control signal $S_X$ coupled to control the on/off state of the switch 60. The microcontroller 75 further generates a data-bus signal $N_B$ coupled to control the multiplexer 87, reads the data from the analog-to-digital converter 80, and reads/writes the command-data through a communication circuit 90 and the communication interface CMB.

Figure 3:
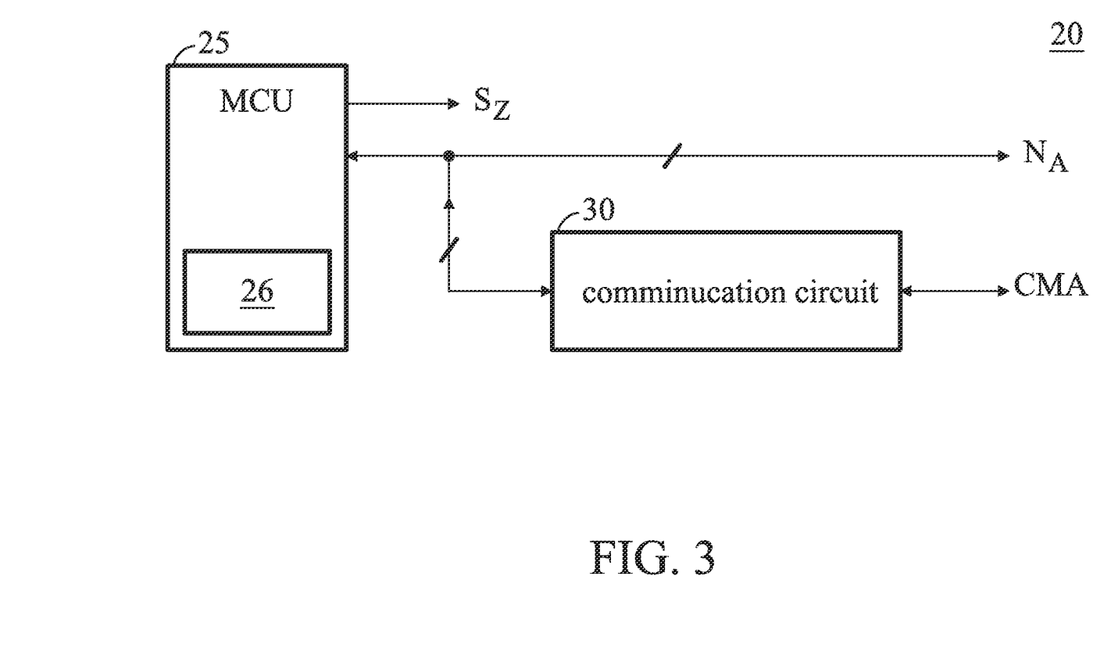
FIG. 3 shows an exemplary embodiment of a control circuit of the charging circuit in FIG. 1.

FIG. 3 shows an exemplary embodiment of the control circuit 20 in accordance with the present invention. The control circuit 20 comprises a microcontroller (MCU) 25. The microcontroller 25 comprises a memory 26, and the memory 26 comprises a program memory and a data memory. The microcontroller 25 generates the control signal $S_Z$ and the data-bus signal $N_A$. The data-bus signal $N_A$ is coupled to read/write the command-data through a communication circuit 30 and the communication interface CMA.

Figure 4:
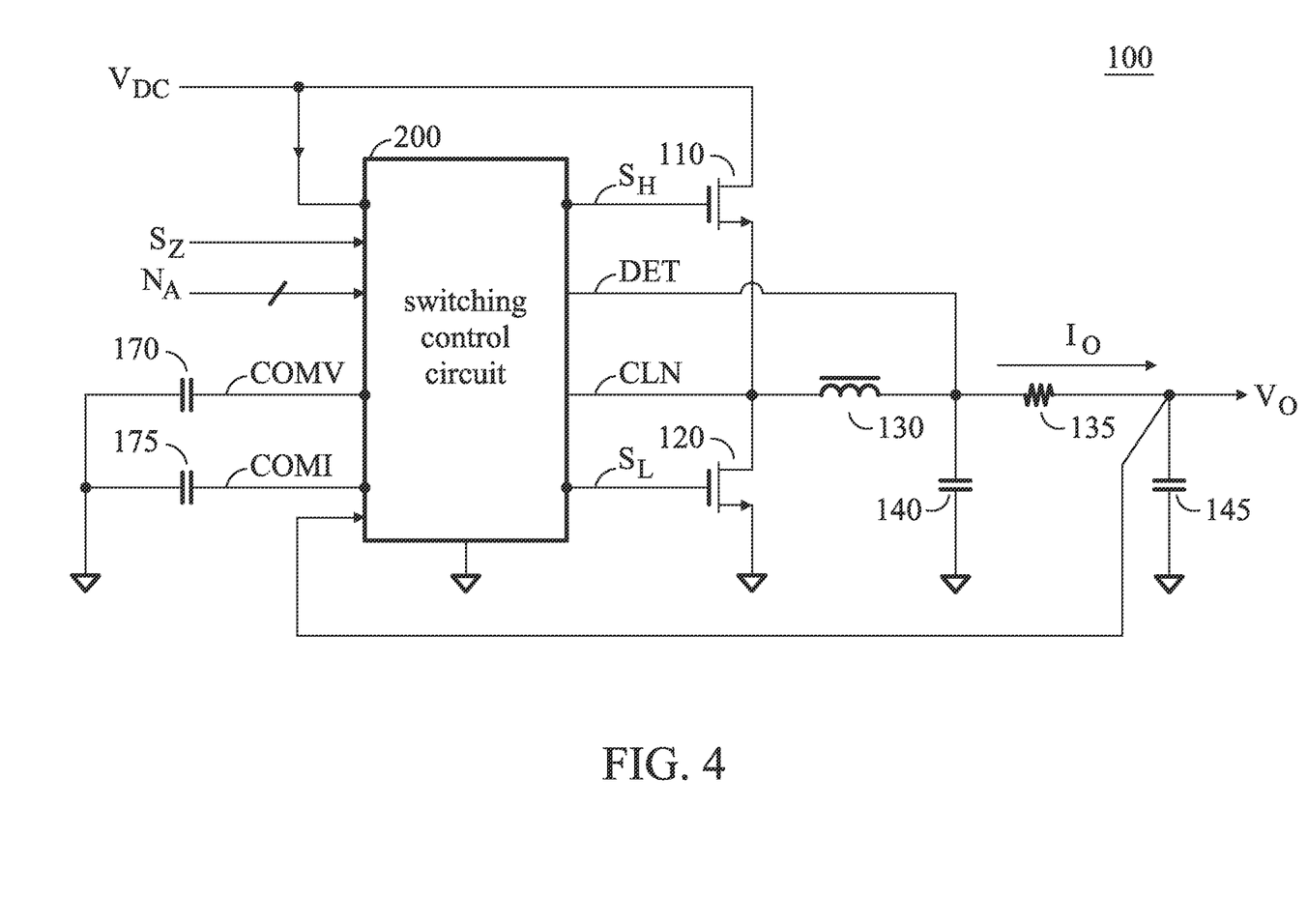
FIG. 4 shows an exemplary embodiment of a programmable power supply circuit of the charging circuit in FIG. 1.

FIG. 4 shows an exemplary embodiment of the programmable power supply circuit 100 in accordance with the present invention. A switching control circuit 200 generates a high-side switching signal $S_H$ and a low-side switching signal $S_L$ coupled to drive a high-side transistor 110 and a low-side transistor 120, respectively, for regulating the output voltage $V_O$ and the output current $I_O$. The transistors 110 and 120, capacitors 140 and 145, and an inductor 130 form a synchronous buck converter for generating the output voltage $V_O$ from the DC power source $V_{DC}$. Accordingly, the high-side switching signal $S_H$ and the low-side switching signal $S_L$ are used to switch the inductor 130 for generating the output voltage $V_O$. A current-sense device, such as a resistor 135, is coupled to detect the output current $I_O$ for generating a current-sense signal DET coupled to the switching control circuit 200. The current-sense signal DET is correlated to the value of the output current $I_O$. A terminal CLN of the switching control circuit 200 provides a floating ground terminal for driving the high-side transistor 110.

The data-bus signal $N_A$ and the control signal $S_Z$ are coupled to control the switching control circuit 200. In accordance with the output voltage $V_O$, the current-sense signal DET, and the control of the microcontroller 25 (via the data-bus signal $N_A$), the switching control circuit 200 generates the high-side switching signal $S_H$ and the low-side switching signal $S_L$ for regulating the output voltage $V_O$ and the output current $I_O$. A capacitor 170 is coupled to a voltage-feedback signal COMV for the voltage-loop compensation. A capacitor 175 is coupled to a current-feedback signal COMI to compensate the current-loop of the output current $I_O$.

Figure 5:
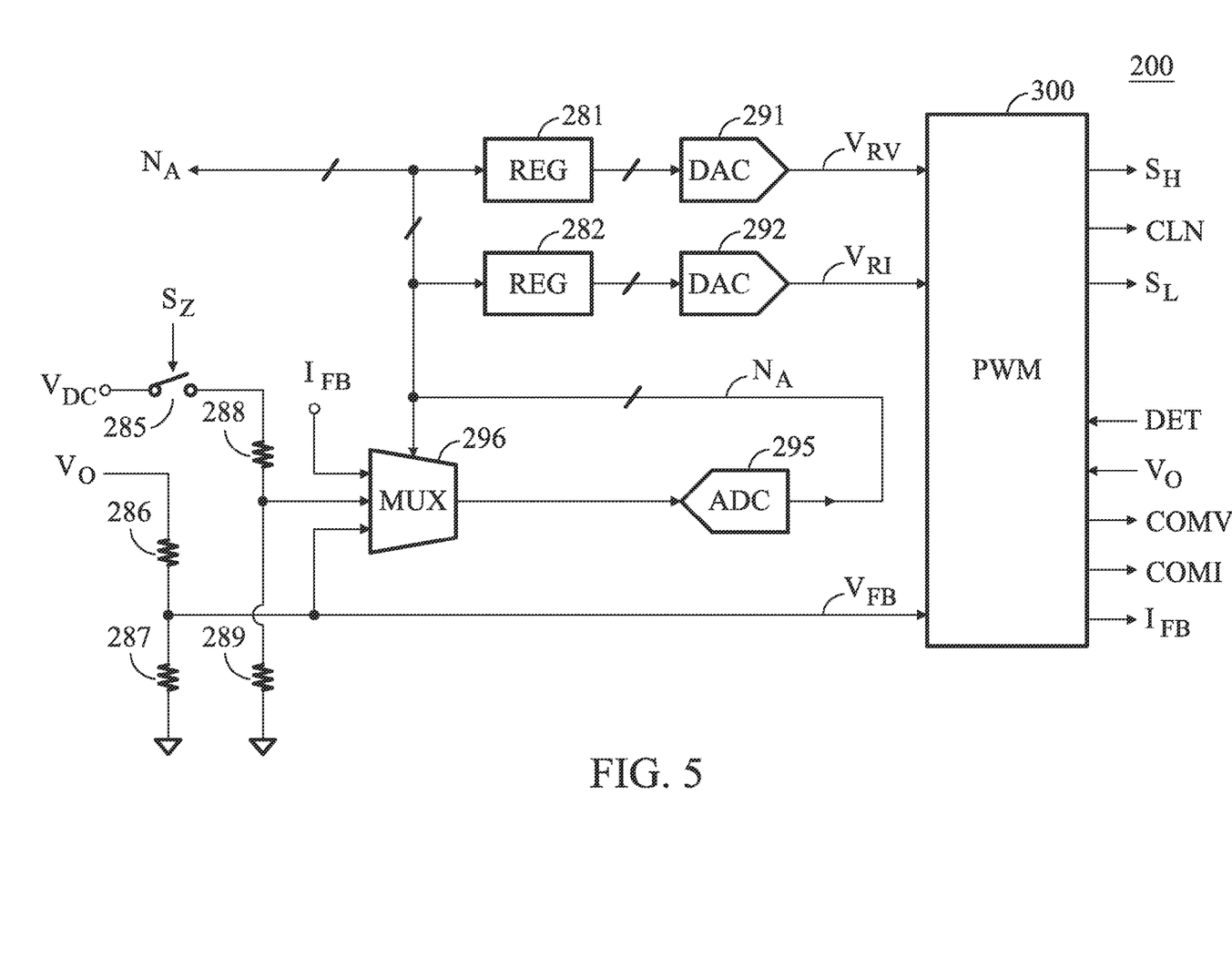
FIG. 5 shows an exemplary embodiment of a switching control circuit of the programmable power supply circuit in FIG. 4.

FIG. 5 shows an exemplary embodiment of the switching control circuit 200 according to the present invention. The data-bus signal $N_A$ is coupled to control a multiplexer (MUX) 296, an analog-to-digital converter (ADC) 295, and digital-to-analog converters (DAC) 291 and 292. The digital-to-analog converters 291 and 292 are controlled by the microcontroller 25 through the data-bus signal $N_A$ and registers (REG) 281 and 282. The current-sense signal DET is coupled to generate a current signal $I_{FB}$ through a PWM (pulse width modulation) circuit (PWM) 300. The current signal $I_{FB}$ is coupled to the multiplexer 296. Resistors 286 and 287 develop a voltage divider for generating a feedback signal $V_{FB}$ in accordance with the output voltage $V_O$. The feedback signal $V_{FB}$ is coupled to the multiplexer 296. A switch 285, resistors 288 and, 289 develop another voltage divider for generating a level-shifted signal in accordance with the voltage of the DC power source $V_{DC}$. The level-shifted signal is also coupled to the multiplexer 296. The switch 285 is controlled by the control signal $S_Z$ for the power saving. The output of the multiplexer 296 is coupled the analog-to-digital converter 295. Therefore, the analog-to-digital converter 295 can detect the output current $I_O$, the output voltage $V_O$, and the level of the voltage of the DC power source $V_{DC}$. Accordingly, via the data-bus signal $N_A$, the microcontroller 25 can read the information of the output current $I_O$, the output voltage $V_O$ and the level of the voltage of the DC power source $V_{AC}$ through the analog-to-digital converter 295. The microcontroller 25 controls the output of the digital-to-analog converters 291 and 292. The digital-to-analog converter 291 generates a programmable voltage reference $V_{RV}$ for controlling the output voltage $V_O$. The digital-to-analog converter 292 generates a programmable current reference $V_{RI}$ for controlling the output current $I_O$. The registers 281 and 282 will be reset to an initial value in response to the power-on of the switching control circuit 200. For example, the initial value of the register 281 will produce a minimum value of the programmable voltage reference $V_{RV}$ that generates the output voltage $V_O$ with 5V. The initial value of the register 282 will produce a minimum value of the programmable current reference $V_{RI}$ that generates the output current $I_O$ with 0.5 A. The programmable voltage reference $V_{RV}$ and the programmable current reference $V_{RI}$ are determined by the command-data. The PWM circuit 300 generates the voltage-feedback signal COMV, the current-feedback signal COMI, the high-side switching signal $S_H$, and the low-side switching signal $S_L$ in response to the programmable voltage reference $V_{RV}$, the programmable current reference $V_{RI}$, the feedback signal $V_{FB}$, and the current-sense signal DET.

Figure 6:
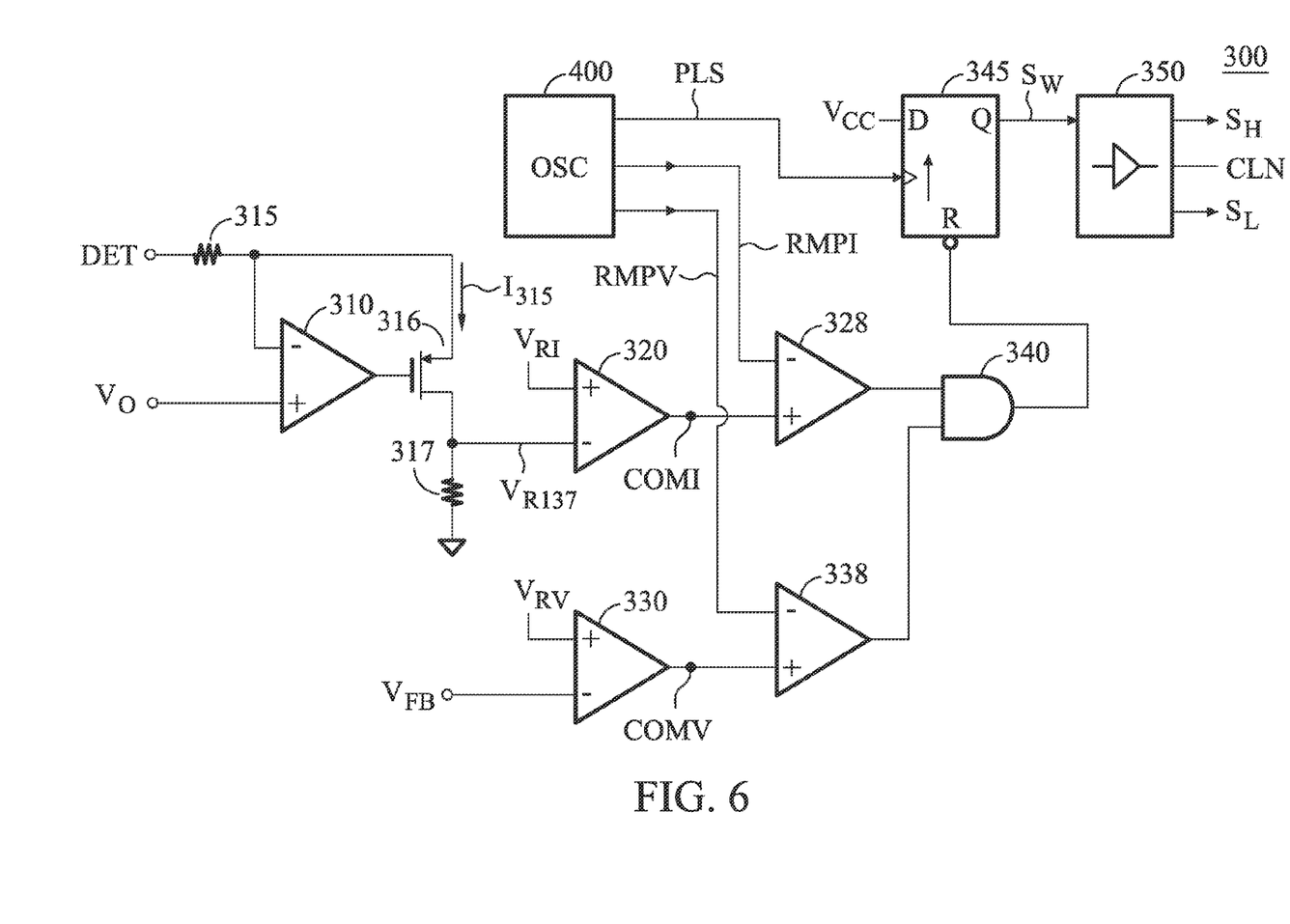
FIG. 6 shows an exemplary embodiment of a PWM circuit of the switching control circuit in FIG. 5.

FIG. 6 shows an exemplary embodiment of the circuit schematic of the PWM circuit 300 in accordance with the present invention. An operational amplifier 310 is applied to drive a transistor 316 and generate a current $I_{315}$ flowing through resistors 315 and 317. A voltage $V_{R315}$ generated on the resistor 315 will be regulated same as the voltage level $V_{R135}$ (the voltage generated on the resistor 135; the voltage across the current-sense signal DET and the output voltage $V_O$) of the current-sense signal DET. The related equations are shown in the following:

$$V_{R135} = I_O \times R_{135} \quad (1)$$

$$I_{315} = \frac{V_{R135}}{R_{315}} \quad (2)$$

$$V_{R315} = V_{R135} \quad (3)$$

$$V_{R317} = I_{315} \times R_{317} = I_O \times \frac{R_{135}}{R_{315}} \times R_{317} \quad (4)$$

A voltage $V_{R317}$ generated on the resistor 317 is thus related to the output current $I_O$. The voltage $V_{R317}$ is coupled to an error amplifier 320 to compare with the programmable current reference $V_{RI}$ for generating the current-feedback signal COMI at the output of the error amplifier 320. The capacitor 175 (shown in FIG. 4) is coupled to the output of the error amplifier 320 for the frequency compensation of the current feedback loop. The feedback signal $V_{FB}$ is coupled to an error amplifier 330 to compare with the programmable voltage reference $V_{RV}$ for generating the voltage-feedback signal COMV at the output of the error amplifier 330. The capacitor 170 (shown in FIG. 4) is coupled to the output of the error amplifier 330 for the frequency compensation of the voltage feedback loop. The current-feedback signal COMI is used for regulating the output current $I_O$. The voltage-feedback signal COMV is used for regulating the output voltage $V_O$. An oscillator (OSC) 400 generates a clock signal PLS and ramp signals RMPV and RMPI. The clock signal PLS is coupled to enable a switching signal $S_W$ via a flip-flop 345.

The ramp signal RMPV is coupled to a comparator 338 to compare with the voltage-feedback signal COMV. The ramp signal RMPI is coupled to a comparator 328 to compare with the current-feedback signal COMI. The outputs of the comparators 328 and 338 are coupled to disable the switching signal $S_W$ through an AND gate 340 and the flip-flop 345. The switching signal $S_W$ is further coupled to generate the switching signals $S_H$ and $S_L$ through an output driver 350.

Figure 7:
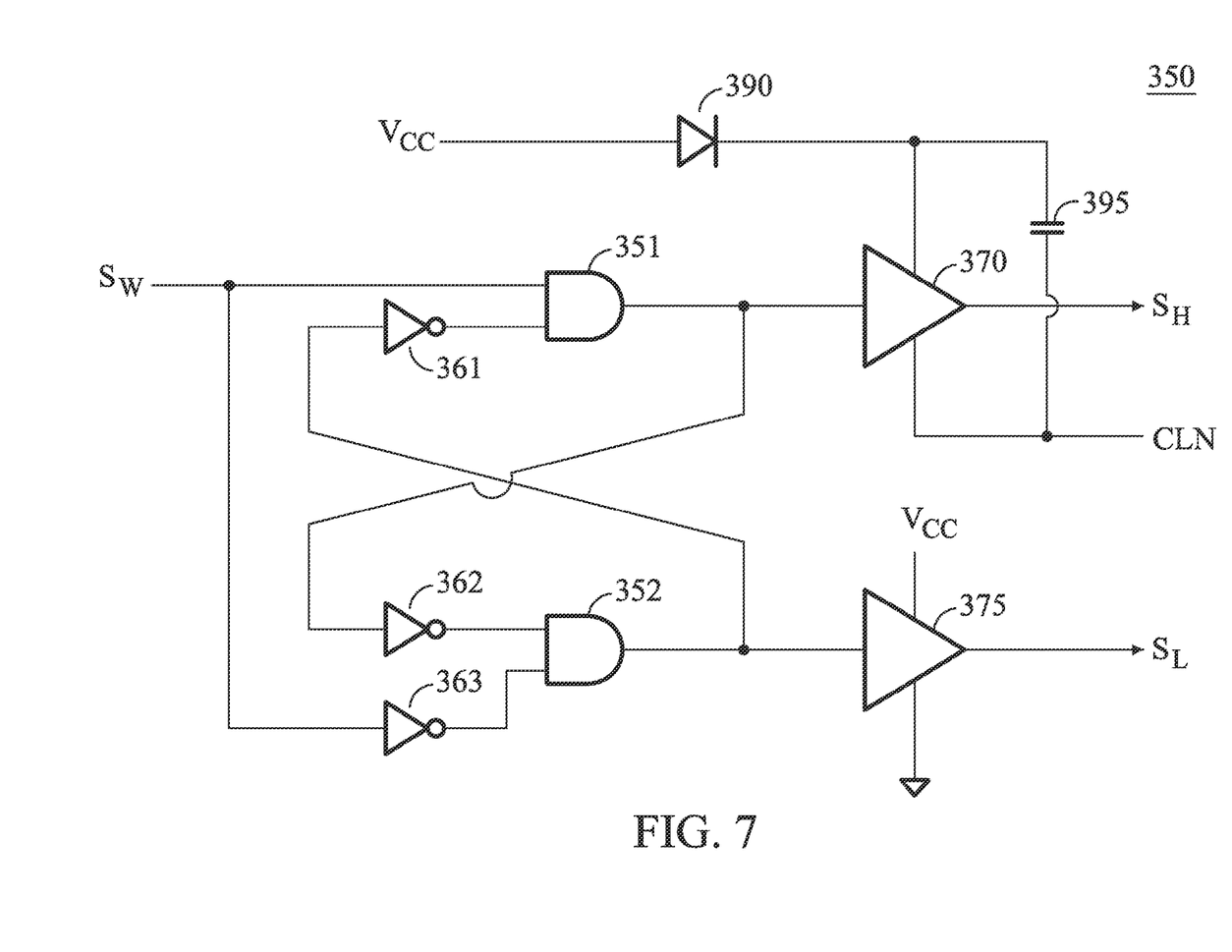
FIG. 7 shows an exemplary embodiment of an output driver of the PWM circuit in FIG. 6.

FIG. 7 shows an exemplary embodiment of the output driver 350 according to the present invention. A diode 390 and a capacitor 395 develop a charge pump circuit which provides a power source for a high-side gate driver 370. A low-side gate driver 375 is powered by a voltage source $V_{CC}$. AND gates 351 and 352 and inverters 361, 362, and 363 develop an exclusive-circuit coupled to receive the switching signal $S_W$ and prevent the switching signals $S_H$ and $S_L$ from being turned on simultaneously.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A charging circuit for charging a battery, comprising:
   a power supplier having a communication interface coupled to a cable of the power supplier for receiving command-data, and generating a DC voltage and a DC current in accordance with the command-data;
   a controller coupled to the battery for detecting a battery-voltage and generating the command-data in accordance with the battery-voltage; and
   a switch coupled to the cable for receiving the DC voltage and the DC current through a connector,
   wherein the DC voltage and the DC current generated by the power supply are coupled to the cable, and the DC voltage and the DC current are programmable in accordance with the command-data,
   wherein the command-data generated by the controller is coupled the cable through a communication circuit of the controller, and the controller is coupled the connector for detecting a connector-voltage and control an on/off state of the switch in response to the connector-voltage; and
   wherein the power supplier comprises:
   a switching control circuit generating a switching signal coupled to switch an inductor for generating the DC voltage in accordance with a voltage-feedback signal which is generated in response to the command-data.

2. The charging circuit as claimed in claim 1, wherein the controller has a communication port coupled to a host CPU.

3. The charging circuit as claimed in claim 1, wherein the power supply is coupled to a DC power source for generating the DC voltage.

4. The charging circuit as claimed in claim 1, wherein the controller comprises an analog-to-digital converter coupled to the battery and the connector for detecting the battery-voltage and the connector-voltage.

5. The charging circuit as claimed in claim 1, wherein the controller comprises a microcontroller with a program memory and a data memory.

6. The charging circuit as claimed in claim 1, wherein the power supplier comprises an embedded microcontroller with a program memory and a data memory.

7. The charging circuit as claimed in claim 1, wherein the switching control circuit generates the switching signal coupled to switch the inductor for generating the DC current in accordance with a current-feedback signal, the switching control circuit generates the current-feedback signal in response to the DC current and a programmable current reference, and the programmable current reference is determined by the command-data.

8. The charging circuit as claimed in claim 7, wherein the switching control circuit comprises a digital-to-analog converter for generating the programmable current reference.

9. The charging circuit as claimed in claim 1, wherein the switching control circuit comprising a digital-to-analog converter for generating the programmable voltage reference.

10. The charging circuit as claimed in claim 1, wherein the switching control circuit comprising an analog-to-digital converter for detecting the DC voltage.

11. The charging circuit as claimed in claim 10, wherein the analog-to-digital converter is further used for detecting the DC current.

12. The charging circuit as claimed in claim 1, wherein the power supplier further comprises a resistor for detecting the DC current.

13. The charging circuit as claimed in claim 12, wherein the switching control circuit comprises an amplifier coupled to the resistor for detecting the DC current.

14. The charging circuit as claimed in claim 1, wherein the switch will be turned off if a voltage drop of the cable and the connector is high.

* * * * *